United States Patent
Kosslyn et al.

(10) Patent No.: US 10,417,716 B1
(45) Date of Patent: Sep. 17, 2019

(54) SPECIFYING SHARING ENTRIES FOR ACCESSING PERFORMANCE STATISTICS OF A MEDIA ITEM

(71) Applicant: Google Inc., Mountain View, CA (US)

(72) Inventors: David Kosslyn, San Francisco, CA (US); Eric Brandon Mayers, San Francisco, CA (US); Matt Wiseman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 571 days.

(21) Appl. No.: 14/825,563

(22) Filed: Aug. 13, 2015

Related U.S. Application Data (60) Provisional application No. 62/056,740, filed on Sep. 29, 2014.

(51) Int. Cl.
| | |
|---|---|
| *G07B 17/00* | (2006.01) |
| *G06Q 40/00* | (2012.01) |
| *G06Q 20/10* | (2012.01) |
| *G06Q 20/40* | (2012.01) |

(52) U.S. Cl.
CPC .............. *G06Q 40/12* (2013.12); *G06Q 20/10* (2013.01); *G06Q 20/40* (2013.01)

(58) Field of Classification Search
CPC .......... G06Q 10/00; G06Q 30/00; G06Q 50/34
USPC .............. 705/14.14, 30, 32, 16; 707/999.001
See application file for complete search history.

(56) References Cited

U.S. PATENT DOCUMENTS

| | | | |
|---|---|---|---|
| 7,110,961 B1* | 9/2006 | Goino | G06Q 30/02 |
| | | | 705/14.14 |
| 9,679,295 B2* | 6/2017 | Ho | G06Q 30/02 |
| 2003/0172012 A1* | 9/2003 | Otsuka | G06Q 10/06393 |
| | | | 705/32 |
| 2004/0049482 A1* | 3/2004 | Brechter | G06Q 10/10 |
| 2007/0203945 A1* | 8/2007 | Louw | G06Q 30/02 |
| 2008/0215467 A1* | 9/2008 | Huffman | G06Q 10/10 |
| | | | 705/30 |
| 2014/0279317 A1* | 9/2014 | Flaherty | G06Q 50/34 |
| | | | 705/31 |

* cited by examiner

*Primary Examiner* — Rokib Masud
(74) *Attorney, Agent, or Firm* — Lowenstein Sandler LLP (57) ABSTRACT

A method for sharing revenue generated by a media item. Such a method includes identifying a media item and multiple revenue sharing entries associated with the media item; causing a revenue generated by the media item to be dispersed to multiple entities in accordance with the multiple revenue sharing entries; and presenting the multiple revenue sharing entries.

20 Claims, 6 Drawing Sheets

SPECIFYING SHARING ENTRIES FOR ACCESSING PERFORMANCE STATISTICS OF A MEDIA ITEM

PRIORITY CLAIM TO RELATED APPLICATION

This application claims the benefit under 35 U.S.C. § 119(e) of U.S. Provisional Patent Application No. 62/056,740, filed on Sep. 29, 2014, the entirety of which is incorporated herein by reference.

TECHNICAL FIELD

This disclosure relates to the field of content-sharing platforms and, in particular, to identifying and compensating entities that are associated with a media item.

BACKGROUND

On the Internet, content-sharing platforms, like social networks and others, allow users to connect to and share information with each other. Many social networks include content-sharing aspects that allow users to upload, view, and share content, such as video content, image content, audio content, and so on (which may be referred to as "media items" or "content items"). Such media items may include professionally produced audio clips, movie clips, TV clips and music videos, as well as content such as blogs, posts, pictures, photos, audio recordings, other multimedia content, etc. Users may use computing devices (such as smartphones, cellular phones, laptop computers, desktop computers, netbooks, and tablet computers) to access the content-sharing platforms to use, play, and/or consume media items (e.g., watch digital videos, and/or listen to digital music).

These media items may generate revenue through advertisements or donations. Often the user that uploaded the media item may receive the revenue associated with the media item and it may be that user's responsibility to reallocate funds amongst other participating user. This process may be time consuming and once the funds are received, it is not always clear to the receiving user whether the received portion is commensurate with the agreed amount.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a method for specifying and identifying revenue shares and sharing revenue from a media item is disclosed. The method includes identifying a media item and multiple revenue sharing entries associated with the media item, causing a revenue generated by the media item to be dispersed to multiple entities in accordance with the multiple revenue sharing entries, and presenting the multiple revenue sharing entries. The media item may be a video and the multiple entities may be entities that have contributed to the creation of the video.

In one implementation, the method further includes creating a revenue sharing entry by identifying an entity and an earnings share in accordance with a contract, the earnings share being a percentage value of the revenue or a fixed fee value. In addition, the method includes notifying the entity of the revenue sharing entry and receiving an approval for the revenue sharing from the entity.

In another implementation, the method includes causing a sum of money to be transferred to a default escrow account before receiving the approval, and causing the sum of money to be transferred to an account designated by the entity after receiving the approval. In addition, the media item may be presented along with the multiple revenue sharing entries to an entity that uploads the media item and to an entity that views the media item without contributing to creation of the media item.

In yet another implementation, the method includes identifying an entity and an earnings share associated with a revenue sharing entry of the multiple revenue sharing entries and modifying an access right for the entity when the earnings share is greater than a threshold value, wherein modifying the access right allows the entity to alter details of the media item and access performance statistics of the media item.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

These drawings may be better understood when observed in connection with the following Detailed Description.

DETAILED DESCRIPTION

The disclosure includes methods and systems for sharing revenue with multiple entities (e.g., persons) associated with a media item. The revenue may be generated by the media item through advertisements, donations, fees or other similar method. The portion of the revenue being shared and the entities with whom it is being shared may be identified by one or more revenue sharing entries. In one example, an uploader of a video may provide information for creating a revenue sharing entry to facilitate sharing of revenue derived from the video with users that contributed to the creation of the video.

The revenue sharing may be implemented by a content-sharing system, which may include an interface to receiving information for creating revenue sharing entries and an interface to display the entities sharing the revenue. Displaying the entities receiving revenue may increase transparency by exposing who benefits from a particular media item. This may be useful in identifying entities that had a substantial role and hence may have a financial stake in the media item.

Frequently in this disclosure, examples directed to user-uploaded videos are presented. This is done for ease of explanation of some of the features described herein. However, embodiments with other content are also within the scope of this disclosure, regardless of whether specific examples of such are provided herein.

Figure 1:
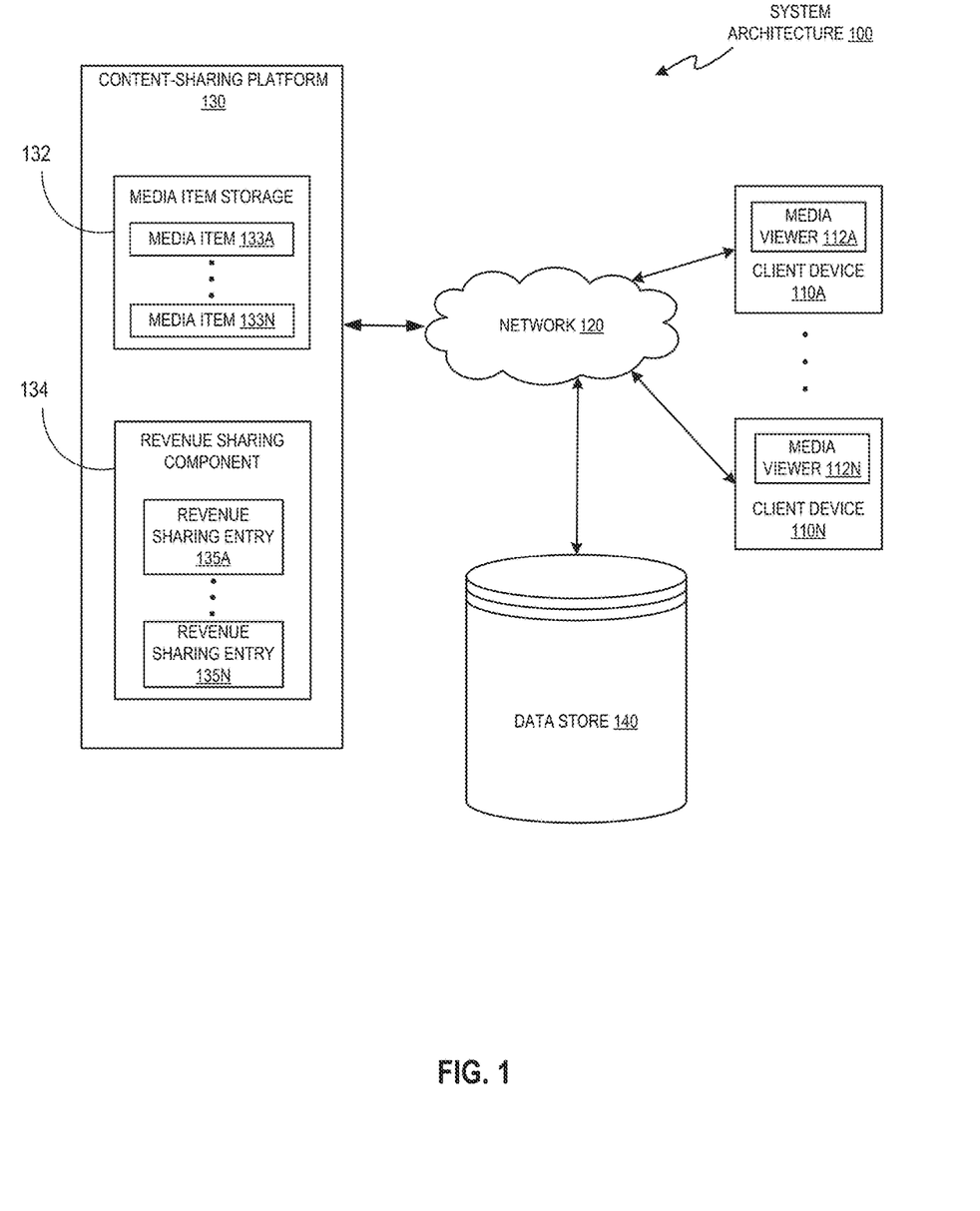
FIG. 1 illustrates an exemplary system architecture, in accordance with an embodiment of the disclosure.

FIG. 1 illustrates an example system architecture 100 for sharing the revenue of media items, in accordance with an embodiment of the disclosure. The system architecture 100 includes a plurality of client devices 110A through 110N, a network 120, a content-sharing platform 130, and a data store 140. In one example, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one example, the data store 140 may include a memory (e.g., random access memory), a cache, a drive (e.g., a hard drive), a flash drive, a database system, a storage area network (SAN), or another type of component or device capable of storing data. The data store 140 may also include multiple storage components (e.g., multiple drives or multiple databases) that may also span multiple computing devices (e.g., multiple server computers) and storage devices such as may be present in a data center.

The client devices 110A-N may each include computing devices such as personal computers (PCs), laptops, mobile phones, smartphones, tablet computers, wearable computing devices, etc. Client devices 110A-N may be used to consume (e.g., view, hear) and upload content to the content-sharing platform 130. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user of a client device. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application, that allows users to view digital media items (e.g., digital videos, digital images, electronic books, shared text, etc.) as part of the content-sharing platform 130.

The media viewers 112 may be provided to the client devices 110A-N by the content-sharing platform 130 and/or a third-party distribution platform. For example, the media viewers 112 may be embedded media players that are embedded in web pages provided by the content-sharing platform 130. In another example, the media viewers 112 may be applications that are downloaded from a server accessible to the client devices 110A-N through the network 120.

In general, functions described in one example as being performed by the content-sharing platform 130 can also be performed on the client devices 110A-N in other embodiments if appropriate. In addition, the functionality attributed to a particular component can be performed by different or multiple components operating together. The content-sharing platform 130 can also be accessed as a service provided to other systems or devices through appropriate application programming interfaces (APIs), and thus is not limited to use in websites.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a smartphone application that may be used to provide a user with access to the media items.

The content-sharing platform 130 may include a media item storage 132 that includes a plurality of media items 133A-N. Examples of media items 133A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. Many other kinds of metadata may be included in the media item storage 132, such as a type of each media item, a creation or uploading date and time of each media, consumption history identifying one or more users of the content-sharing platform 130 that have consumed media item, etc. Every media item having a metadata entry including metadata stored in the metadata database 138 may not have every kind of metadata stored in association with it.

In some examples, media items 133A-N may be consumed (e.g., viewed and/or heard) via the Internet and/or via a mobile device application. As used herein, "media," "media item," "online media item," "digital media," "digital media item," "content," and "content item" can include and refer to an electronic file that can be executed, loaded, or played using software, firmware, or hardware configured to present the digital media item to a viewing user of the content-sharing platform 130.

The content sharing platform 130 may include revenue sharing component 134, which may include one or more revenue sharing entries 135A-N. Each revenue sharing entry 135A-N may be associated with one or more media items and may identify an entity and an earnings share value. Revenue sharing component 132 may analyze revenue sharing entries to establish where to distribute revenue generated from the media item as will be discussed in more detail in FIG. 2 and FIG. 3.

Figure 2:
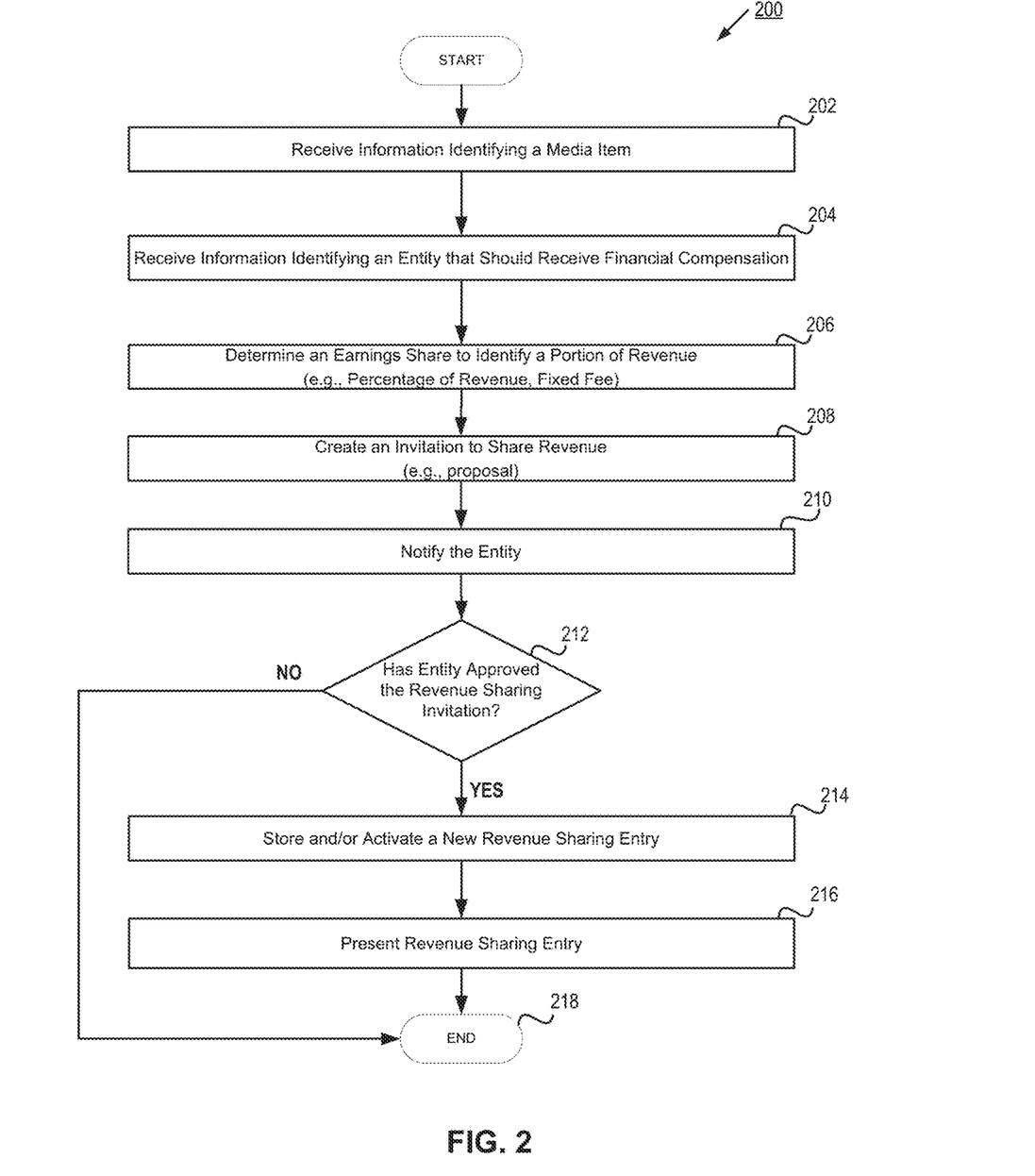
FIG. 2 is a flow diagram illustrating a method of creating a revenue sharing entry according to some embodiments of the disclosure.

FIG. 2 is a flow diagram illustrating a method 20 for creating a new revenue sharing entry 135A. The method 20 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 200 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory, tangible computer-readable device or storage medium. In one embodiment, method 300 may be performed by a collaboration component (e.g., collaboration component 134 shown in FIGS. 1 and 2).

Embodiments of method 200 may begin at block 202 where the processing logic may receive information identifying a media item (e.g., video, web content). The media item may have been uploaded by a user of the content-sharing platform 130 in an effort to attract viewers.

At block 204, the processing logic may receive information that selects an entity that should receive some form of financial compensation. The entity may be directly associated with the media item, for example, the entity may have participated in the creation of the media item. In one example, if the media item is a video, the selected entity may be an actor, director, producer, lighting designer, production studio, marketer or other similar position. In another example, the media item may be a blog or forum and the selected entity may be a moderator, editor, reporter, photographer or marketer. The entity may also be indirectly associated with the media item, for example, the entity may have contributed financing and/or ideas for the media item or may encourage others to experience (e.g., view, listen) the media item, such as a curator, promoter or similar entity. In another example, an entity may add captions to a video in many languages and may be provided revenue sharing rights for media items consumed in those languages. The entity may not be related in any way to the media item, for example, the entity may be a charity, friend, family member, or financial institution that has been designated to receive revenue but is not affiliated with the media item.

At block 206, the processing logic may determine an earnings share, which may be used by the revenue sharing component to calculate a portion of the revenue (e.g., sum of money) to be shared with another entity. The earnings share may be a value or a formula. An earnings share value may be a percentage value (e.g., percentage revenue) or a fixed fee value (e.g., monetary amount). The percentage value may indicate that the entity should receive the designated percentage of the total revenue generated by the media item. The fixed fee value may indicate the sum of money the entity may be paid. The earnings share may also be based on financial sharing formula which may consist of a system of rules such as "pay up to $X, from the earned revenue", or "pay X % up to revenue Y, then pay Z %", wherein Y and Z are different entities. In one example, the earnings share value and the entity may be derived from an informal or formal agreement (e.g., contract) between the entities.

At block 208, the processing logic may create an invitation (e.g., proposal) to share revenue based on the entity and earnings share value. The revenue sharing component may then transmit a notification of the invitation to the entity associated with the newly created sharing invitation, as shown in block 210. The notification may inform the entity that it may receive revenue associated with the media item. The notification may be in the form of an alert such as an in-product notification via icon or textual message. This may include a modification to a mobile application to include for example, a different icon or an icon modified with an overlay. In another example, the notification may be disseminated separate from a web or mobile application for example through email, SMS or instant message.

At block 212, the processing logic may determine if the entity has approved the revenue sharing entry. Allowing the entity to approve the revenue sharing may be advantageous because accepting revenue may be interpreted as a form of endorsement or acceptance of the cause set forth by a media item. For example, a political entity that receives revenue from a publisher may be viewed by others as supporting the cause of the publisher.

Prior to receiving a response from the entity, the revenue sharing entry may be in a dormant state. During the dormant state the entity may not receive revenue, and instead the revenue may be deposited in an escrow account as discussed in more detail below. If the entity disapproves the revenue sharing entry it will transition to a deactivated state. During the deactivated state the entry may not be used for calculating or disseminating revenue but may still be viewable and may be activated or removed at a later time. In an alternative, once the entity rejects the revenue sharing entry it may be removed and no longer viewable.

The processing logic may include procedures to automate the approval or disapproval of revenue sharing entries. In one example, an invitation may be automatically processed based on a list of entities, for example an approved list (e.g., white list) or disapproved list (e.g., black list). The list may include one or more entities that have requested revenue sharing invitation be automatically processed. When the identified entity is on a black list, the invitation may be automatically disapproved and the processing logic may branch to 318 and end. If the entity is on a white list the invitation may be automatically approved and may branch to block 216. This may be advantageous because it may allow entities to receive financial contributions with less delay than if approval was required.

In another example, the processing logic may automate disapprovals using a timeout mechanism. The timeout mechanism may be based on a predetermined duration of time (e.g., 1 week, 1 month, 1 year or other similar duration of time) and if the entity fails to respond within the duration of time, the new revenue sharing entry may transition from the dormant state to the deactivated state.

At block 214, the processing logic may store and/or activate a revenue sharing entry 135A. Revenue sharing entry may be associated with: a specific media item; the selected entity; and the earning share. Storing a revenue sharing entry may include creating a new entry to an existing revenue sharing data structure that is associated with the media item or it may include creating a separate data structure.

Storing or activating a revenue sharing entry may also increase an access right of the entity identified in the revenue sharing entry. This access right may allow the entity to modify details (e.g., title description) of the media item and access performance details of the media item. The performance details (e.g., statistics, analytics) may include revenue, views, comments, likes, dislikes, and/or similar performance information. The rights may be modified when the earnings share (e.g., value or formula) exceeds a threshold value, wherein the threshold value is equivalent to a specific percentage, (e.g., 25%, 50%, 75%) or is based on the mean or median earnings share. The rights may also be modified in proportion to the earnings share, for example, the rights may have multiple levels (e.g., access, edit) and the higher the earnings share the higher the rights level assigned to the entity.

In one example, the processing logic may identify an entity and an earnings share associated with a revenue sharing entry and may subsequently modify the entity's access right when the earnings share is greater than the threshold value. This may involve modifying the permissions of media item and/or modifying the permissions of the entity's account. The modification may change or enhance the access right allowing the entity to alter details of the media item and access performance statistics of the media item.

At block 216, the processing logic may display (e.g., present) the revenue sharing entries for other entities to view. Presenting a revenue sharing entry may involve displaying multiple revenue related fields, for example, there may be a payment field that includes a binary value indicating whether the entity has been paid or not paid. The display may also include the earning share value (e.g., percentage of revenue, fixed fee amount). In another example, the display may include the running total (e.g., monetary sum) being paid based on revenue from the media item.

The revenue sharing entries may be presented to the entity that uploaded the media item and/or any entity that is identified by at least one revenue sharing entry, such as a "sharee". One advantage of this is that it may increase transparency of payments and allow the sharees to verify that they are being allocated the agreed upon share. This may not be something that is easy to establish using other methods, for example, a receiving party may not be able to look at a bank account statement to determine if they are receiving the correct percentage of revenue since the total revenue may not be known or it may be time consuming to calculate the total revenue for a specific duration of time in question.

In another example, the revenue sharing entry may be presented to any entity experiencing (e.g., viewing, listening, consuming) the media item. This may increase transparency by allowing the experiencing entity to more easily identify entities that were more substantially involved in creating the media item. For example, the fact that they have a financial stake may indicate they were an important part of the media. In addition, the earnings share value (e.g., percentage) may be used as a proxy to indicate the level of the entity's involvement.

Aside from the examples set forth in FIG. 2, there may be alternate examples that are within the scope of this disclosure. For example, the revenue sharing component may function similar to method 200; however, the system may not use invitations and may instead utilize a series of revenue sharing entry states, such as a dormant state, an activated state, or a deactivated state. At block 208, a newly created revenue sharing entry may be created instead of an invitation. The newly created revenue sharing entry may begin in a dormant state until it is either approved, in which case it may be activated or disapproved, in which case it may be deactivated.

Figure 3:
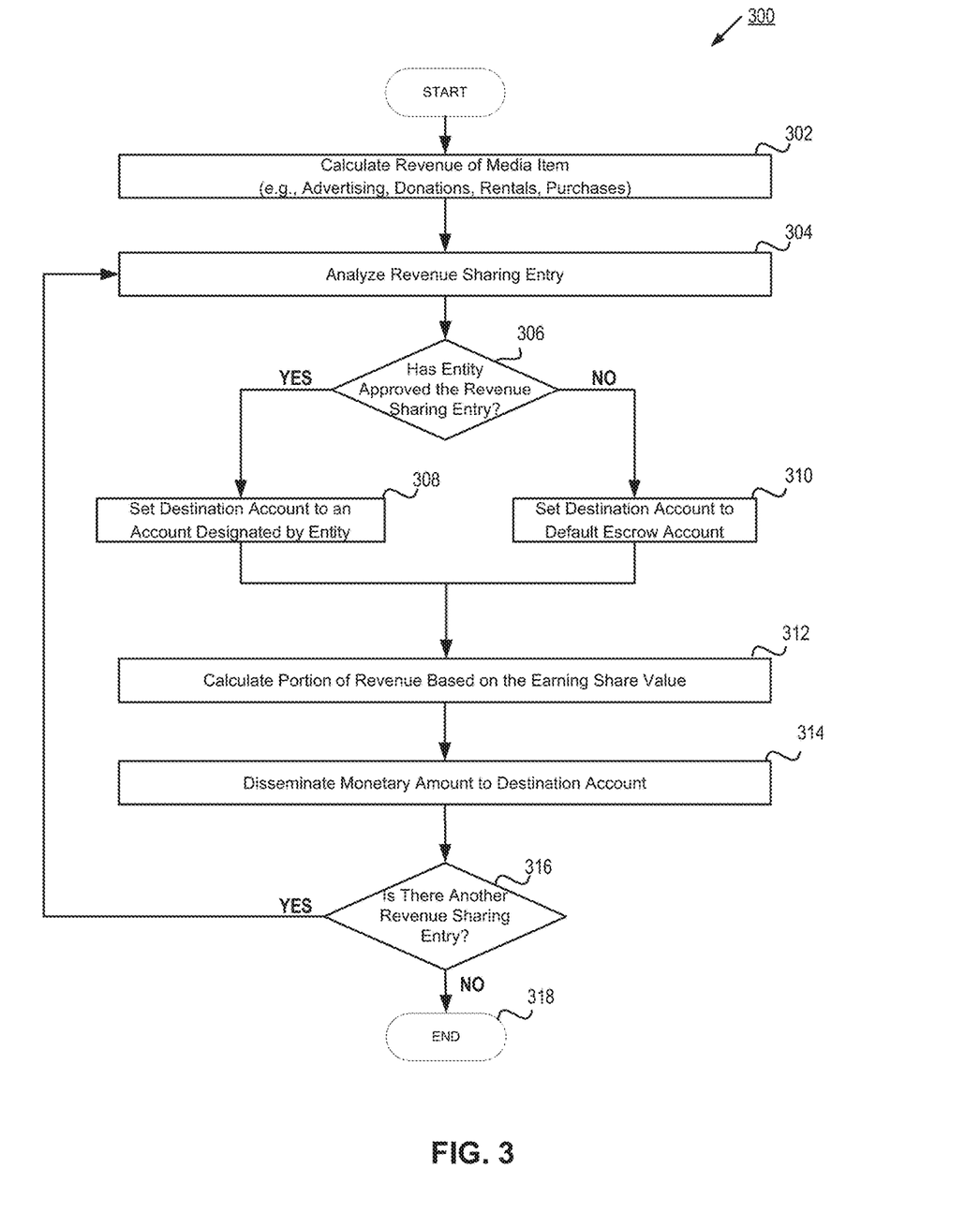
FIG. 3 is a flow diagram illustrating a method of sharing revenue according to some embodiments of the disclosure.

FIG. 3 is a flow diagram illustrating a method of sharing revenue using revenue sharing entries, which may have been created using the above method. At block 302, the processing logic may calculate revenue generated by a media item. The revenue may be based in part on advertisement impressions derived from users consuming, experiencing, clicking, or interacting with an advertisement. The advertisements may include, overlay ads, companion ads, banner ads, commercials and/or other similar advertisements associated with a media item. The revenue may also be based on rental fees, purchase fees, donations and/or other similar method of transferring value (e.g, sum of money). The revenue may be calculated continuously, for example, every time a disbursement is made or may be calculated hourly, daily, weekly, monthly, yearly or other similar duration of time.

At block 304, the processing logic may analyze a revenue sharing entry to determine the entity and earnings share associate the revenue sharing entry. In one example, it may iterate through each revenue sharing entry and process (e.g., calculate and disseminate money) one entry at a time. Alternatively, it may batch all or some of the revenue sharing entries and process them in parallel.

At block 306, the processing logic may determine if the entity identified in the revenue sharing entry has approved (e.g., accepted, verified) the sharing entry. If the entry has been approved, revenue sharing component 134 may proceed to block 308 and set the destination account to a financial account designated by the entity. If the entity has not responded, revenue sharing component 134 may proceed to block 310 and set the destination financial account to a default escrow account. The default escrow account may be formed automatically by the platform or set up by the administrator or entity hosting the platform.

At block 312, the processing logic may calculate the portion of revenue based on the earnings share value. As discussed above, the portion of revenue may be a static value (e.g., fixed fee) or it may be a dynamic value based on the revenue (e.g., percentage of revenue).

At block 314, the processing logic may disseminate a monetary amount to the appropriate destination account. The dissemination step may include instructing a financial institution to transfer funds.

At block 316, the processing logic may determine whether there is another revenue sharing entry associated with the media item being processed. If there is, the method may branch to block 304 to analyze the revenue sharing entry, otherwise it may proceed to block 318 and end.

In another example, method 300 may analyze one or more revenue sharing entries and determine that the revenue is not sufficient to meet the sharing requirements (e.g., cumulative earnings share). This may occur, for example, when the revenue sharing entries include fixed fees that exceed the total revenue. In response, the processing logic may include a system of rules that assist in prioritizing the disbursements discussed above. In one example, revenue sharing component 134 may use rules to modify the amount of the disbursement (e.g., payment). This may include prorating the portion of each entity's fixed fees, for example if the revenue is a fraction (e.g., ¼, ½, ¾) of the total outstanding fixed fees it may pay that fraction of each entity's fees. In another example, it may use rules to modify the order of the payments. This may include ranking the revenue share entries and paying a higher ranked share in full before proceeding to the next highest ranked entry. In which case if the total revenue generated by the media item fails to meet the cumulative earnings share amount the revenue sharing entry with a low rank may not be paid.

Figure 4:
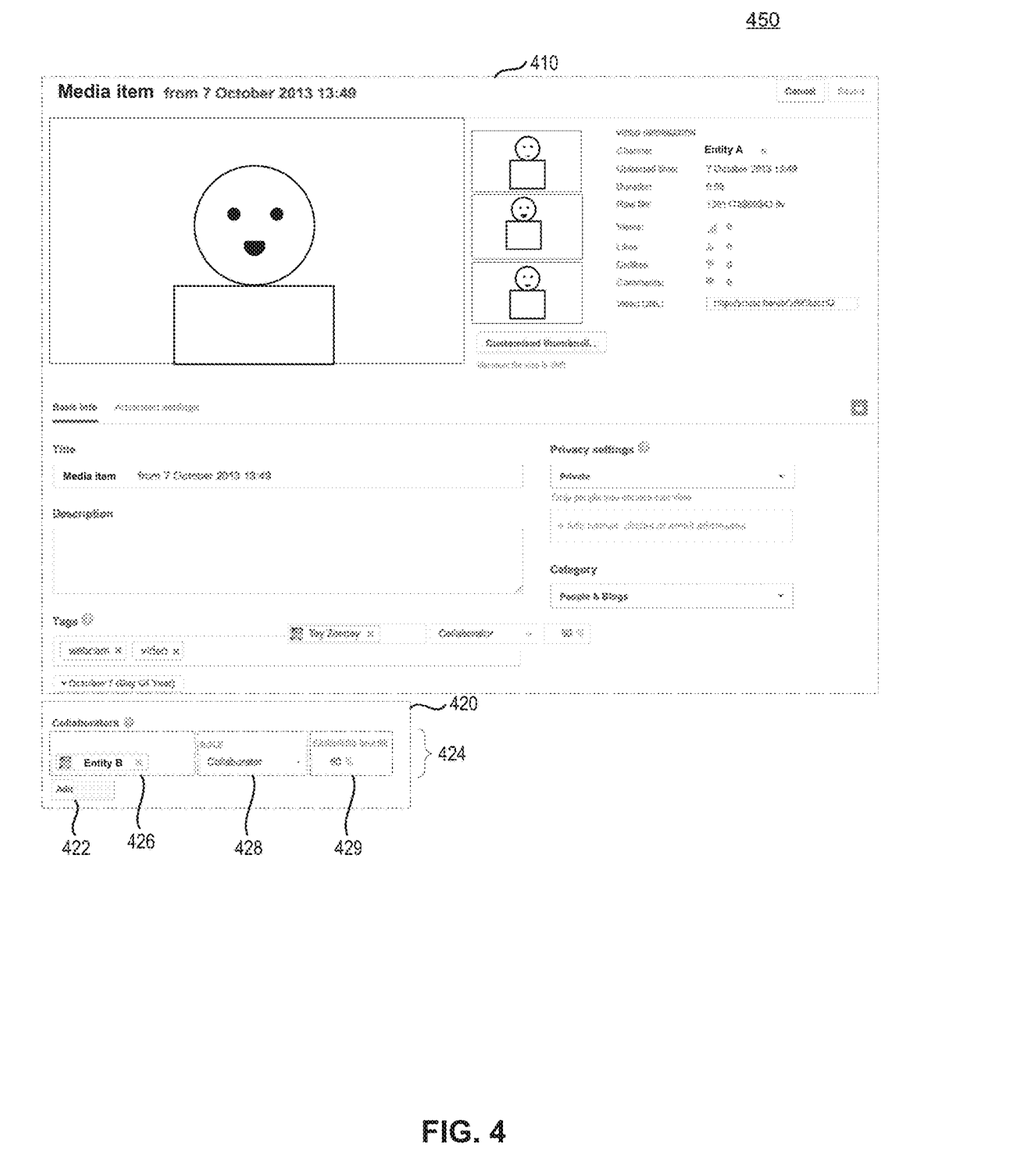
FIG. 4 illustrates an example user interface (UI) 450 for facilitating the creation of revenue sharing entries, in accordance with some aspects of the present disclosure.

FIG. 4 illustrates an example user interface (UI) 450 for facilitating the display, modification and creation of revenue sharing entries, in accordance with some aspects of the present disclosure. Interface 450 includes media item area 410 and revenue sharing area 420. Media item area 410 may include an area dedicated to the presentation of the media item as well additional details about the media item, such as the title and duration of the media item. Revenue sharing area 420 may include an add button 422 and one or more revenue sharing entries 424.

Each revenue sharing entry 424 may include an entity area 426, a role area 428, and an earning share area 429. Each area may be manually populated by a user interacting with the user interface. In one example, a user may manually enter "Entity B" from entity area 426, "Collaborator" from role area 428 and value "50%" for earnings share area 429. In one example, selection of a role may automatically populate a default earnings share value that may be dynamically calculated based on the type of role and the quantity of other roles. In another example, the order of revenue sharing entries may indicate or correspond to a ranking of the entries and may affect the order or portion paid as discussed above.

Interface 450 may present both the media item and the revenue sharing entries next to one another. As shown in FIG. 4 revenue sharing entries may be presented below the media item, however the revenue sharing entries may also be presented above, to the side, overlaid on the media item or other similar arrangement.

Figure 5:
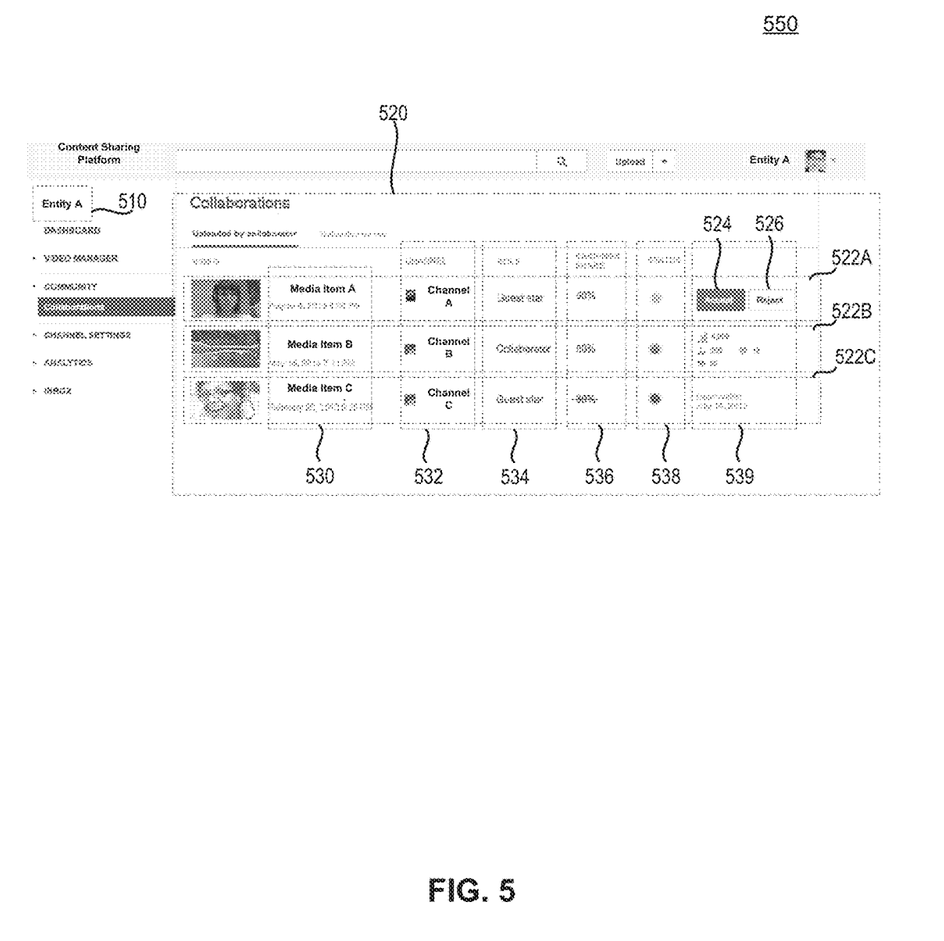
FIG. 5 illustrates an example user interface (UI) 550 for displaying an entity's revenue sharing entries, in accordance with some aspects of the present disclosure.

FIG. 5 illustrates an example user interface (UI) 550 for presenting an entity's multiple revenue sharing entries that span multiple media items. Interface 550 may include entity area 510 and a collaborations area 520, which may include media item entries 522A-C. Each of the media item entries may correspond to a revenue sharing entry and may include a title area 530, a channel area 532, a role area 534, an earnings share value area 536, a status area 538 and/or a details area 539. The title area 530 may display the title of the media item and the channel area 532 may display the channel that is responsible for uploading the medial item, which may also correspond to the entity's name. Role area 534 may display the role associated with entity A in the media item.

Details area 539 present information that may depend on the state of the revenue sharing item. For example, when a revenue sharing entry has an outstanding invitation or is in a dormant state, details area 539 may display possible response options for the entity identified by the revenue sharing entry, as seen by media entry 522A. The response options may include accept button 524 and reject button 526. If the revenue sharing entry has been accepted, details area 539 may include the media item statistics, for example, the quantity of views, likes, dislikes and/or comments, as seen by media entry 522B. If the revenue sharing entry has been rejected, details area 539 may display the date/time that the entry was rejected (e.g., deactivated).

Status area 538 may also depend on the state of the revenue sharing item. As shown in FIG. 4, there may be three or more status indicators displayed in status area 538. A greyed-out status indicator may represent a response has not yet been received, a green indicator may represent that the revenue sharing entry is active and a red indicator may indicate the revenue sharing entry is deactivated.

Figure 6:
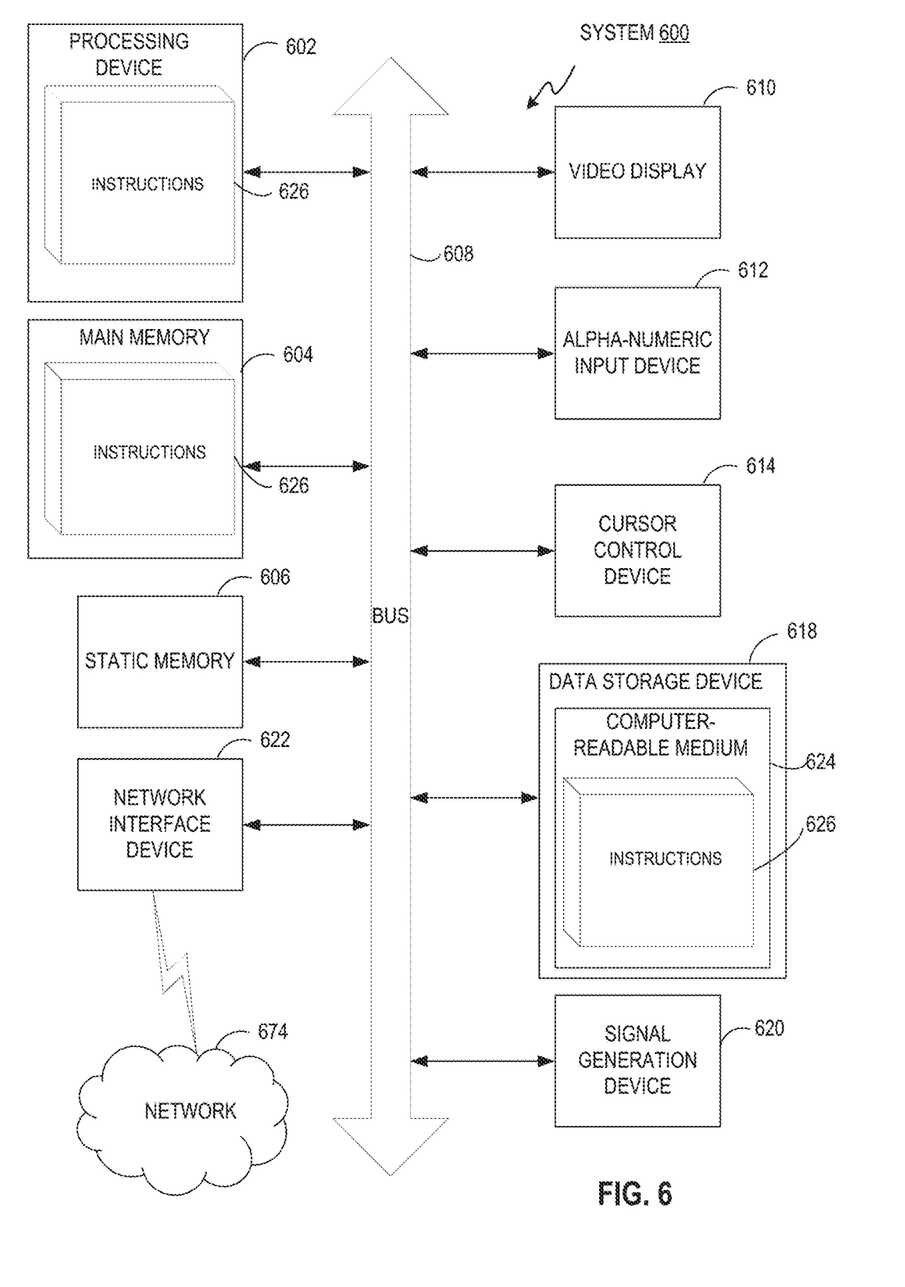
FIG. 6 is a block diagram illustrating an exemplary system architecture, according to some embodiments.

FIG. 6 illustrates a diagrammatic representation of a machine in the exemplary form of a computer system 600 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like, having one or more cores. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein. For example, the processor 602 may execute instructions 626 to perform method 300 as shown herein in FIG. 3.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a physical keyboard or a virtual keyboard), a cursor control device 614 (e.g., a mouse), and a signal generation device 620 (e.g., a speaker).

The data storage device 618 may include a non-transitory computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for providing a media item storage 132 and a revenue sharing component 134 or other features which may correspond, respectively, to identically-named counterparts described with respect to FIG. 1 and/or a software library containing methods for displaying content in between loops of a looping media item. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying a media item and multiple sharing entries associated with the media item, the multiple sharing entries indicating multiple entities contributing to a creation of the media item, wherein a sharing entry of the multiple sharing entries comprises a share value for an entity;
causing performance data of the media item to be shared with the multiple entities in accordance with the multiple sharing entries, wherein the entity of the sharing entry is provided access to the performance data based on the share value and a predetermined threshold value; and
providing for display, by a processing device, a user interface presenting the multiple sharing entries with a presentation of the media item by a media player, wherein the user interface exposes the multiple entities over a public network to viewers of the media item.

2. The method of claim 1, wherein the media item comprises a video and the multiple entities are entities that have contributed to a creation of the video.

3. The method of claim 1, further comprising creating the sharing entry in response to user input by identifying the entity and the share value, wherein the share value comprises a percentage value.

4. The method of claim 3, further comprising:
notifying the entity of the sharing entry; and
receiving an approval for the sharing entry from the entity.

5. The method of claim 4, wherein the performance data comprises a number of at least one of views, comments, revenue, likes, or dislikes, and wherein the share value indicates a portion of the number to associate to the entity.

6. The method of claim 1, wherein the presenting comprises presenting the media item along with the multiple sharing entries to an entity that uploads the media item and to an entity that views the media item without contributing to creation of the media item.

7. The method of claim 3, further comprising:
identifying the entity and the share value associated with the sharing entry; and
modifying an access right for the entity when the share value is greater than the threshold value, wherein modifying the access right allows the entity to alter details of the media item and access the performance data that comprises performance statistics of the media item.

8. A system comprising:
a memory; and
a processing device communicably coupled to the memory, the processing device to execute instructions to:
identify a media item and multiple sharing entries associated with the media item, the multiple sharing entries indicating multiple entities contributing to a creation of the media item, wherein a sharing entry of the multiple sharing entries comprises a share value for an entity;
cause performance data of the media item to be shared with the dispersed to multiple entities in accordance with the multiple sharing entries, wherein the entity of the sharing entry is provided access to the performance data based on the share value and a predetermined threshold value; and
provide for display a user interface that presents the multiple sharing entries with a presentation of the media item by a media player, wherein the user interface exposes the multiple entities over a public network to viewers of the media item.

9. The system of claim 8, wherein the media item comprises a video and the multiple entities are entities that have contributed to a creation of the video.

10. The system of claim 8, wherein the processing device is further to: create the sharing entry in response to user input identifying the entity and the share value, wherein the share value comprises a percentage value.

11. The system of claim 10, wherein the processing device is further to:
notify the entity of the sharing entry; and
receive an approval for the sharing entry from the entity.

12. The system of claim 11, wherein the performance data comprises a number of at least one of views, comments, revenue, likes, or dislikes, and wherein the share value indicates a portion of the number to associate to the entity.

13. The system of claim 8, wherein to present multiple sharing entries the processing device is further to, present the media item along with the multiple sharing entries to an entity that uploads the media item and to an entity that views the media item without contributing to creation of the media item.

14. The system of claim 10, wherein the processing device is further to:
identify the entity and the share value associated with the sharing entry; and
modify an access right for the entity when the share value is greater than the threshold value, wherein to modify the access right allows the entity to alter details of the media item and access the performance data that comprises performance statistics of the media item.

15. A non-transitory machine-readable storage medium storing instructions, which cause a processing device to execute operations comprising:
identifying a media item and multiple sharing entries associated with the media item, the multiple sharing entries indicating multiple entities contributing to a creation of the media item, wherein a sharing entry of the multiple sharing entries comprises a share value for an entity;
causing performance data of the media item to be shared with multiple entities in accordance with the multiple sharing entries, wherein an entity of the sharing entry is provided access to the performance data based on the share value and a predetermined threshold value; and
providing for display a user interface presenting the multiple revenue sharing entries with a presentation of the media item by a media player, wherein the user interface exposes the multiple entities over a public network to viewers of the media item.

16. The non-transitory machine-readable storage medium of claim 15, wherein the media item comprises a video and the multiple entities are entities that have contributed to a creation of the video.

17. The non-transitory machine-readable storage medium of claim 15, further comprising creating the sharing entry in response to user input identifying the entity and the share value, wherein the share value comprises a percentage value.

18. The non-transitory machine-readable storage medium of claim 17, further comprising:
notifying the entity of the sharing entry; and
receiving an approval for the sharing entry from the entity.

19. The non-transitory machine-readable storage medium of claim 18, wherein the performance data comprises a number of at least one of views, comments, revenue, likes, or dislikes, and wherein the share value indicates a portion of the number to associate the entity.

20. The non-transitory machine-readable storage medium of claim 15, wherein the presenting comprises presenting the media item along with the multiple sharing entries to an entity that uploads the media item and to an entity that views the media item without contributing to creation of the media item.

\* \* \* \* \*